(No Model.)

G. E. RUTTER.
COUNTERPOISING APPARATUS FOR WEIGHING AND STRENGTH TESTING MACHINES.

No. 451,955. Patented May 12, 1891.

Witnesses:
H. S. McArthur
G. P. Kramer

Inventor:
G. E. Rutter
by Foster & Freeman
Attorneys.

UNITED STATES PATENT OFFICE.

GEORGE EVAN RUTTER, OF LONDON, ENGLAND.

COUNTERPOISING APPARATUS FOR WEIGHING AND STRENGTH-TESTING MACHINES.

SPECIFICATION forming part of Letters Patent No. 451,955, dated May 12, 1891.

Application filed November 22, 1890. Serial No. 372,362. (No model.)

*To all whom it may concern:*

Be it known that I, GEORGE EVAN RUTTER, a subject of the Queen of England, residing at Brixton Hill, Surrey, London, in England, have invented certain new and useful Improvements in Counterpoising Apparatus for Weighing, Strength-Testing, and Similar Machines, of which the following is a specification.

This invention relates to the counterpoising apparatus used in weighing-machines, and by its use I am enabled to dispense with the usual springs or weights.

The invention will be best understood by reference to the accompanying drawings, in which—

Figure 1:
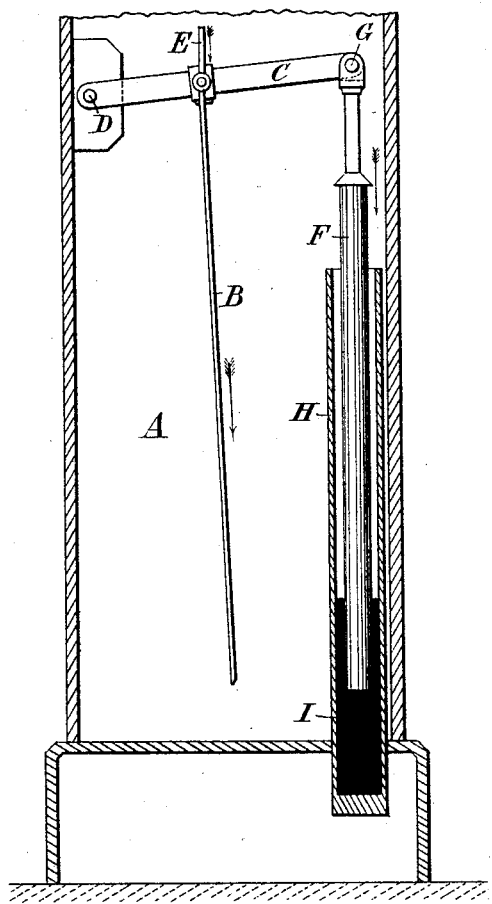
Figure 2:
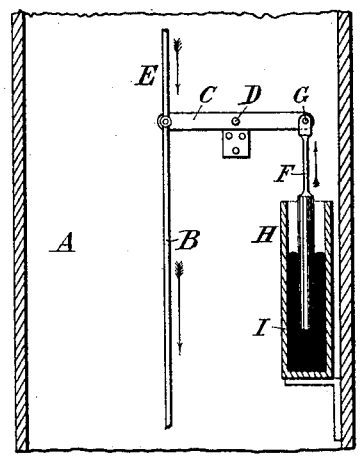
Figure 3:
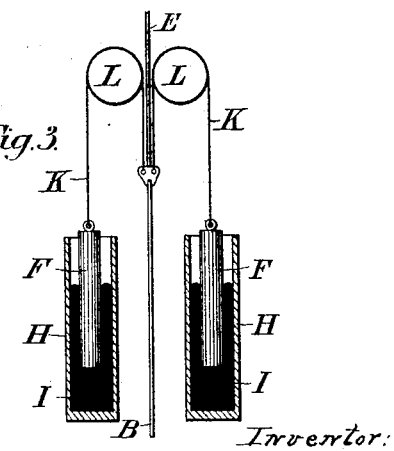

Figure 1 is a vertical section of so much of the apparatus as is necessary to explain the invention, and Figs. 2 and 3 are similar views of modified forms of the apparatus.

Similar letters are used in all figures.

A represents a portion of the casing of an automatic or coin-freed weighing or strength-testing machine, to which class of machines this invention is particularly applicable, although the invention is applicable to weighing, strength-testing, and similar machines in general.

B is a rod, cord, or equivalent connected with the weighing-platform, the load pulling the rod B in the direction of the arrow.

C is a lever pivoted at D to the case or frame-work, and E is a rod or similar connection to the dial or other indicating apparatus, which, forming no part of the present invention, it is not necessary to further describe.

F is a plunger, which may be made of wood, iron, or other suitable material, pivoted at G to the lever C, and H is a fixed cylinder secured in the case or frame and adapted to contain a fluid resistance or counterpoise I, preferably of mercury.

The operation is as follows: The balance between the weight of the resistance I and that of the plunger F is such that the latter floats in the mercury I at a convenient height, in which position the dial-indicator stands at zero. When the load is down, the platform-rod B is pulled down, the lever C following this motion, and thus forcing the plunger F into the resistance I, which is thus forced up in the cylinder H and offers an increasing resistance as the plunger is forced farther into it. By properly graduating the dial or indicator a very accurate standard of measurement may be thus obtained. A cap may be placed over the open end of the cylinder H, if desired, to check any escape of mercury due to moving the machine about.

The operation of the device shown in Fig. 2 is similar to that of Fig. 1, excepting that the load is obtained by withdrawing the plunger from the mercury instead of forcing it into it. The position of the pivot D is now in the center of the lever C' or between the pivots of the plunger F and rod B, so as to reverse the action upon the plunger, the load withdrawing it from the mercury instead of forcing it into it. The arrows indicate the respective movement, and the operation will be well understood.

The device shown in Fig. 3 is, for practical purposes, the same as that in Fig. 1, but the counterpoising apparatus is doubled. There are two cylinders H, two plungers F, two mercury baths I; but the plungers are connected with the rod B by means of two cords K, passing over two pulleys L, one end of each cord being fastened to the rod B and the other to the plunger F. The movement for operating the indicating mechanism may be taken direct from the rod B or from one or both of the plungers F, but preferably from the rod B. In the drawings this is accomplished by means of the rod E, which may either pass between the cords K, as shown, or may be fixed to a bracket extending from the rod B.

I claim—

The complete counterpoise mechanism for scales, weighing, strength-testing, and similar machines, consisting of fixed cylinder H, fluid-resistance or counterpoise I, plunger F, lever C, and rod B, the whole constructed and operating substantially as described, and illustrated in the accompanying drawings.

In testimony whereof I hereunto set my hand in the presence of the two subscribing witnesses.

GEORGE EVAN RUTTER.

Witnesses:
 HENRY HART,
 HARRY B. BRIDGE.